United States Patent
Mullins et al.

(10) Patent No.: US 7,043,481 B2
(45) Date of Patent: May 9, 2006

(54) SYSTEM, METHOD AND SOFTWARE FOR CREATING, MAINTAINING, NAVIGATING OR MANIPULATING COMPLEX DATA OBJECTS AND THEIR DATA RELATIONSHIPS

(75) Inventors: Ward Mullins, San Francisco, CA (US); Alexandre Martins, Floianopolis (BR)

(73) Assignee: Thought, Inc., San Francisco, CA (US)

( * ) Notice: Subject to any disclaimer, the term of this patent is extended or adjusted under 35 U.S.C. 154(b) by 490 days.

(21) Appl. No.: 10/158,672

(22) Filed: May 30, 2002

(65) Prior Publication Data

US 2004/0015829 A1 Jan. 22, 2004

Related U.S. Application Data

(60) Provisional application No. 60/295,012, filed on Jun. 1, 2001, provisional application No. 60/300,754, filed on Jun. 25, 2001, and provisional application No. 60/305,847, filed on Jul. 16, 2001.

(51) Int. Cl.
 *G06F 17/30* (2006.01)

(52) U.S. Cl. .................. 707/10; 707/3; 707/103 R; 707/104.1; 703/2; 709/218; 717/5; 717/107

(58) Field of Classification Search .............. 707/1–10, 707/100, 102, 103 R, 104.1, 200; 709/218, 709/213, 214; 103/2; 717/1–5, 107, 104; 719/328
See application file for complete search history.

(56) References Cited

U.S. PATENT DOCUMENTS

| | | | | |
|---|---|---|---|---|
| 5,107,418 A | * | 4/1992 | Cramer et al. .............. 717/155 |
| 5,499,371 A | | 3/1996 | Henninger et al. .......... 606/194 |
| 5,542,078 A | | 7/1996 | Martel et al. ................. 707/101 |
| 5,611,076 A | * | 3/1997 | Durflinger et al. ........... 707/102 |
| 5,713,014 A | * | 1/1998 | Durflinger et al. .............. 707/4 |
| 5,779,310 A | * | 7/1998 | Suskey et al. ............... 707/102 |
| 5,799,310 A | * | 8/1998 | Anderson et al. ............ 707/102 |
| 5,850,535 A | * | 12/1998 | Maystrovsky et al. .......... 703/2 |
| 5,855,013 A | * | 12/1998 | Fisk ............................... 707/3 |
| 5,857,182 A | * | 1/1999 | DeMichiel et al. ............. 707/3 |
| 5,930,824 A | * | 7/1999 | Anglin et al. ................. 711/162 |
| 6,016,497 A | * | 1/2000 | Suver ....................... 707/103 R |
| 6,096,095 A | * | 8/2000 | Halstead ....................... 717/107 |
| 6,163,776 A | * | 12/2000 | Periwal ........................ 707/4 |
| 6,215,495 B1 | * | 4/2001 | Grantham et al. ........... 345/419 |
| 6,243,717 B1 | * | 6/2001 | Gordon et al. ............... 707/203 |
| 6,405,198 B1 | * | 6/2002 | Bitar et al. ..................... 707/6 |
| 6,411,954 B1 | * | 6/2002 | Roffe et al. ..................... 707/8 |
| 6,662,199 B1 | * | 12/2003 | Flight et al. .............. 707/104.1 |
| 6,721,740 B1 | * | 4/2004 | Skinner et al. ............... 707/10 |
| 2002/0124055 A1 | * | 9/2002 | Reisman ...................... 709/218 |

FOREIGN PATENT DOCUMENTS

EP  0 809 198 A  11/1997

OTHER PUBLICATIONS

Markowitz v M et al.: "Object queries over relational databases: Language, implementation and applications" Proceedings of the International Conference on Data Engineering. Vienna, Apr. 19–23, 1993.

* cited by examiner

*Primary Examiner*—Shahid Al Alam
(74) *Attorney, Agent, or Firm*—Robert Lev

(57) ABSTRACT

The invention provides systems, methods and software for creating, maintaining, accessing, navigating and persisting complex data objects and associated data stores. In one aspect, the invention also provides an application programming interface ("API") useful for creating, maintaining, accessing, navigating and persisting complex data objects and associated data stores as a CDOG model.

16 Claims, 2 Drawing Sheets

(Complex Data Object Graph "CDOG")

FIGURE 1
(Complex Data Object Graph, "CDOG")

Billing AddressObject — 10

1 to 1 — 5

Customer Object

A Complex Data Object (CDO) in this CDOG shows an Object Name/Definition or/or its Data Plus a Description of Its Relationship to Other Objects in the CDOG. For Example the Customer Object is Part of a CDO That Has at Least 4 Elements Shown: the Object Name and Definition (Maybe a Customer Name as Data), a 1 to 1 Relationship with the Business Address Object, and a 1 to Many (1 to M) Relationship With 3 Order Objects 1 — 35 — Order Object — 40 — 85 — 1 to M — 75 — Item Ordered Object — 90
— Item Ordered Object — 80

25 — Order Object — 30 — 1 to M — 65 — Item Ordered Object — 70

1 to M — 15 — Order Object — 55 — 1 to M — 45 — Item Ordered Object — 60
20 — Item Ordered Object — 50

(Complex Data Object Graph "CDOG")

SYSTEM, METHOD AND SOFTWARE FOR CREATING, MAINTAINING, NAVIGATING OR MANIPULATING COMPLEX DATA OBJECTS AND THEIR DATA RELATIONSHIPS

Based on Provisional Applications: 60/295,012 filed on Jun. 1, 2001; 60/300,754 filed on Jun. 25, 2001; and, 60/305,841 filed on Jul. 16, 2001.

FIELD OF THE INVENTION

The field of the present invention relates generally to computer systems, computer data stores and to methods and software for accessing and utilizing data stores. More particularly, the present invention relates to a system, methods and software for creating, maintaining, accessing, navigating and persisting complex data objects and associated data stores. In one aspect, the invention also relates to an application programming interface ("API") useful for creating, maintaining, accessing, navigating and persisting complex data objects and associated data stores as a complex data object graph, or as a set of complex data object graphs.

BACKGROUND OF THE INVENTION

Systems for accessing data stores from object oriented languages have been used for many years. A frequent approach to accomplish access of data stores involves writing and embedding custom access code within an object application needing the access. This approach is generally limited to having the custom code access only a single relational table within a relational database or similar construct within any other data store (hereinafter collectively "data store"). Under the circumstances where a developer has control over the design and creation of a data store from its inception, it is possible to design and store meaningful information in a single table. Such design opportunities are usually rare, however.

Generally, the design goals of a properly normalized relational data store or specific object data store, for example conflict with those of object application models. An object application model may exist in one or more of a computer's memory, an application data store and an application information storage repository that may be independent of the data store organization or object definitions. Whether a data source is a relational database, an object database or a flat file (text) base, procedures and systems exist for converting retrieved data to a data object, or to a data object definition, that is mapped to the data source. Advancements in the art have been made with respect to tools for conveniently mapping objects to systems of tables and maps in order to expedite accessing, changing and updating data stores. See, for example, U.S. Pat. No. 5,857,197 (and its associated programming interfaces ("APIs")) describes tools for translating object data to relational data, relational data to object data, and object data to object data to expedite the use of data stores. One or more of such data stores, data objects, data object definitions, may be utilized by an object programming application and may be illustrated as a model of data objects or as a model of data object definitions.

A further problem complicates the creation, access, changing or deleting of an object application model that utilizes such data stores. The object application model may be distributed over multiple physical computer machine locations or even distributed over multiple Internet website locations that may be independent of the data stores. The object application model may utilize a different set of data objects or different set of definitions for relationships between data objects than that of one or more of its data sources. In most situations, the respective structures of the data sources and of the object applications model simply do not conveniently allow for mapping, accessing or changing of an overall schema of application data objects as well as any associated definitions of relationships between two or more data objects or elements within a data object.

Importantly, relationships may exist between a data object and one or more of the other data objects found in the object application model or in a data object of the data source. A relationship between one data object and another data object or with a data source may be member selected from the group of three relationship types consisting of 1 to 1 (1—1), 1 to many (1–M) or many to many (M—M). Complex combinations of these relationships may exist as a data object relationships definition for a given data object. These relationships are described or illustrated in further detail later in this document.

Objects may logically span multiple relational tables or multiple object databases, and may even be distributed over a logical (or hypothetical) computer system involving multiple physically independent computer systems or even multiple website locations. Creating, accessing, maintaining or updating an object application model can require working with multiple translation modules and require tedious and repetitive updating of multiple individual computer systems or multiple data sources in order to do useful work and keep the object application model synchronized. Such approaches are both costly and unwieldy in terms of computing and development resources, particularly with respect to Internet based electronic commerce (eCommerce) object application models.

Data objects of an object application model are often a feature of eCommerce object programming applications, where information is obtained from a data source and the data is defined as a data object (e.g., as a Java class) for use with another computer application. In practice, a data object or model of data objects may exist only in the random access memory of a computer memory system, or may be saved to either a data source or to some other type of retrievable information repository. A programmer or administrator of an object data application may not be able to exhaustively display the overall model or diagram of data objects for an object application model or to display some of its specific elements. Unfortunately, tools for accessing and displaying data objects and associated data object relationships as a complex data object graph model have not been well implemented in the field of object language programming.

A computer application can execute one or more of the following non-limiting actions with respect to one or more of the members selected from the group consisting of data, a data object, and a data object definition: access data, change data, create data, create a new relationship between one or more data objects by creating or changing at least one data object relationship definition, change or delete a relationship between one or more data objects by changing or deleting at least one data object relationship definition, access a data object relationship definition and use its parameters to access a data source or a data object, and access one or more data object relationship definitions or data objects to create a new data object or data object relationship. Any changes executed by a computer application with respect to one or more of the members selected from the group consisting of data, data object or data object definition may need to be properly persisted (permanently stored) to preserve any changes to one or more of the members selected from the group consisting of data, a data object and a data object definition.

A data object and an associated data object relationship definition may be represented by a complex data object graph ("CDOG"). A CDOG, for the purposes of this document, may be thought of as a computer program data object graph that represents a data object having at least one relationship with at least one other data object or with itself via a circular link. When the data object of a CDOG is implemented in the Java computer program language, the CDOG may be further defined as being a Java Data Object Graph ("JDOG").

There is a need for an easily navigable tool for detecting any relationships of a data object in order to provide a CDOG definition and for persisting any changes to at least one member selected from the group consisting of a data object, any data associated with the related object, or any associated CDOG definition (i.e., an changes to the data object, data or to a relationship of the data object with another data object). For example, there is a need to be able to properly sever relationships between at least two data objects in a convenient and efficient manner by simply making a change to the CDOG definition for one of the two related data objects.

An illustration of this might be a customer account CDOG of a company where the customer has become insolvent. Using the technology presently available, a computer applications programmer or administrator would ordinarily need to individually delete or update the data in the data source, in any instances of the data object and in any instances of any associated data objects, as well as to delete or update any associated data object relationship definitions, which would be particularly tedious and repetitive in a distributed application model. There is currently no computer programmer or system administrator tool that is efficiently adapted for an object applications CDOG model with features that permit convenient and efficient accessing and deleting of a single instance of a complex data object and (without further input) results in the tool automatically deleting all existing associated data objects and relationships and the tool automatically updating all local and distributed instances of the CDOG and its associated data, data objects and data object relationships on the local or distributed computer system.

Accordingly, there is a strong need in the art for a computer applications programmer tool designed to assist a programmer or administrator in the actions of deleting, inactivating or updating of a CDOG, wherein the computer applications programmer tool can be configured to automatically delete, inactivate or update at least one member selected from the group consisting of associated data, associated data objects and associated data object relationship definitions to reflect the deleting, inactivating or updating of a CDOG. A particularly strong need exists for such a tool having the further ability to be configured to persist, propagate and reflect system wide (in a local or distributed computer system) any such changes to a CDOG instance to all instances of the CDOG and to all instances of associated data, data objects and data object relationships.

DEFINITIONS

The following non-exhaustive list of definitions is used herein to define terms that may otherwise be confusing or can sometimes have multiple meanings. Each occurrence of a defined term in the above text, in the text that follows, or in the claims of this document, is to be given the meaning ascribed to it in the list of definitions below.

"Instance" as referred to in this document in the context of computer software applications is a single occurrence of a software logical element in the memory of a computer system, such as a "class", an "object", a "data object", and the like.

"Class" as referred to in this document in the context of computer software applications is a logic unit in a computer application or a computer software program where the application or program is based upon an objected oriented programming language (e.g., Java). In practice, a class is a logical unit used as a logical template in an object oriented language from which to allocate new instances of objects.

"Object" as used in the context of this document is a general term referring to a logic unit in a computer application or a computer software program where the application or program is based upon an objected oriented programming language (e.g., Java). The term "object" may ordinarily be used interchangeably with the term "class" as a template or as an instance depending on the context.

"Data object" as referred to in the context of this document represents the concept of the occurrence of an object that holds data within a specific computer application domain and is likely to have its contents stored in a persistent data source of a computer system (e.g., a database server, a binary file, a text file, or even in a combination of two or more of such a persistent data sources of a computer system). A data object may exist as an independent data object without any relationship to any other data object or it may have one or more relationships with itself or with one or more other data objects.

"Complex data object" (or "CDO") as used in the context of this document refers to the occurrence of a data object that has at least one or more relationships with itself, or at least one or more relationships with one or more other data object(s). In a given instance of a CDO at least one relationship is populated as a link, as defined below. A CDO may have a multiplicity of different relationships with itself or with one or more additional CDOs.

"Relationship" or "data relationship" as used in the context of a CDO refers to the type of logical combination that occurs between a data object with itself, or refers to the type of logical combination that occurs between a data object and at least one another data object. Among other references or descriptions, such a relationship is always referred to or partially described by a "relationship type". This term is used in an object oriented language context to reference or describe any expectations, actions and limitations possible between two or more data objects.

"Relationship type" in the context of this document is a label that specifies the possible multiple combinations that can occur between a CDO and itself or with at least one other CDO. The possible relationship type labels are 1—1 (one to one), 1–M (one to many) and M—M (many to many). A given CDO may be simultaneously related to more than one other CDO through several different types of relationship.

"Link" as used in this document with respect to a CDO identifies a particular occurrence of a relationship between a CDO and itself, between a CDO and another CDO. The occurrence of at least one populated link results in an instance of the CDO.

"Circular link" as used in this document with respect to a CDO identifies a particular occurrence of a relationship between a CDO and itself that may be direct or indirect (e.g., linked to itself through another CDO).

"Relationship definition" or "relationship description" in the context of this document and computer software applications refers to information, or an abstraction of information, regarding a "relationship", "data relationship" "relationship type" or a "link" that can be stored, accessed, transferred, communicated, displayed or edited.

"Complex data object graph" or "CDOG" is a term employed herein as an abstraction to logically represent a set of complex data objects and a set of their corresponding relationships.

"Java data object graph" or "JDOG" is a term employed herein as an abstraction to logically represent a set of complex data objects and a set of their corresponding relationships that are part of a Java programming application.

"Application model" or simply "model" are essentially interchangeable terms employed herein as abstractions to logically convey a collective description or other representation for a set of complex data objects and a corresponding description or other representation of their relationships. In one respect, these terms are used logically herein provide a general way of efficiently communicating when referring to set of metadata (i.e., data about data) that describes possible data entities (e.g., objects, database tables, maps, etc,) data relationship types, and data constraints involved in a computer system or application, or in a specific instance of an application. It is important to understand the context in which the terms "application model" and "model" are used in this document. Ordinarily computer engineers refer to the "model" as an abstraction rather than a specific possibility or instance of the model as applied. However, in this document for the ease of communication abstractions of the model, possible implementations of the model and instances of the model are all referred to generally as "application model" or "model". From the context of its use the term will be clear.

"Navigation", "navigating" or "navigated" in the context of the present document refers to an action implementing at least one object to interact with a set of related objects for a certain purpose, such as creation, access, insertion, modification and deletion of an object, or of one of its relationships.

"Navigation model" as used herein is a special type of application model that is applied specifically to a description (or other representation) of how objects can relate to each other and what might be the expected behavior when a CDOG is navigated for a certain purpose.

"Object schema" is a term employed herein as an abstraction referring to the set of data object classes that describe the possible data objects that can be created, modified or maintained in an application, or describing an instance of a set of data object classes in an application.

SUMMARY OF THE INVENTION

An object of the present invention is to provide a system for creating, maintaining, accessing, navigating and persisting complex data objects as a complex data object graph (CDOG) model. In a preferred embodiment, an object of the present invention is to provide such a system that can display the CDOG model as a graph or table of complex data objects. A further object is to provide such a system is located on, or is part of, a local or distributed computer system.

An object of the present invention is to provide a method for creating, maintaining, accessing, navigating and persisting complex data objects stores as a complex data object graph. In a preferred embodiment, an object of the present invention is to provide such a method having the step of displaying or printing a representation of the CDOG model as a graph or table of complex data objects. In a further object, such a method involves a local or distributed computer system.

An object of the present invention is to provide a computer software program having at least one user interface and having at least one feature for at least one action selected from the group consisting of creating, maintaining, accessing, navigating and persisting complex data objects as a CDOG model. In a preferred aspect, an object of the present invention is to provide software program with a module or associated software program having a feature for displaying or printing a representation of the CDOG model as a graph or table of complex data objects. In a preferred object of the invention, such a software program has an editing interface for editing a CDOG model, or an editable input or source, such as a file, that can be modified to implement changes to a CDOG model. A further object is to provide such a software program adapted for a local or distributed computer system.

An object of the present invention is to provide an application programming interface ("API"), as a preferred embodiment of the invention, wherein the API can be accessed to create, maintain, access, navigate and persisting complex data objects as a CDOG model, or as an object schema. In one aspect the API can be accessed by a computer software program, or by a computer software program module that is part of a software package including the API, to provide at least one action selected from the group consisting of creating, maintaining, accessing, navigating and persisting complex data objects as a CDOG model. In a preferred aspect, an object of the present invention is to provide such an API as part of a software tool package having a component or method for displaying or printing a representation of the CDOG model as a graph or as table(s) of complex data objects. In another preferred object, such a software tool package including the API would be provided with an editing interface for editing the CDOG model, or has an editable input or source, such as a file, that can be modified to implement changes to the complex data object model. It is a particularly preferred object to provide such an interface as a point and click graphical user interface that may be displayed and/or edited. A further object is to provide such a API for operation on a local or distributed computer system.

A preferred object of the present invention is to provide a software tool comprising the API according (as described above), adapted for a local network or a distributed network environment, wherein said software tool provides persistence in an object oriented language environment transparently by implementing a configurable network component capable of acquiring and persisting CDOGs through network APIs.

A further object of the present invention is to a software tool capable of reading a source programming object logic model or a database file in a format selected from the group consisting of a UML data file, m a XMI data file, and a XML file and converting the information into a target member selected from the group consisting of a database definition XML file, a database mapping definition file, and a CDOG definition file. In a preferred object, the software can automatically generate a persistence layer that corresponds to the object model information of the source file.

BRIEF DESCRIPTION OF THE DRAWINGS

For the non-limiting purpose of illustrating some of the concepts of complex data objects CDOs, i.e., data objects and their relationships to one another, according to the invention, two CDO graph drawings FIG. 1 and FIG. 2 are provided.

FIG. 1 is a complex data object (CDO) graph drawing, which illustrates a customer object and some of its related objects (billing address, orders and items ordered), as well as relationships between the objects. Relationships of the types 1 to 1 (1—1) and 1 to many (1–M) are shown in this CDO graph. More specifically, FIG. 1 illustrates a CDO graph drawing presenting an instance of a customer object 1 having a 1 to 1 (1—1) relationship (5) with its customer billing address object 10, and a 1 to many relationship (collectively 15, 25, and 35) with the three outstanding order objects 20, 30 and 40, respectively. Order object 20 is an instance of an outstanding order object having a 1 to many relationship (collectively 45 and 55) with the two items ordered objects 50 and 60, respectively. Order object 30 is an instance of an outstanding order object having a relationship with a single order item, but order object 30 has a 1 to many relationship (65) with the item ordered object 70, since many order items could have been associated. Order object 40 is an instance illustrates a 1 to many relationship (collectively 75 and 85) with the two items ordered objects 80 and 90, respectively.

FIG. 2 is a complex data object (CDO) graph drawing, which illustrates a company object and some of its related objects (corporate address and some of its departments and employees), as well as relationships between the objects. Relationships of all three types: 1 to 1 (1—1), 1 to many (1–M) and many to many (M—M) are shown in this CDO graph. More specifically, FIG. 2 illustrates a CDO graph drawing presenting an instance of a company object 100 having a 1 to 1 relationship (650) with its corporate address object 700, and a 1 to many relationship (collectively 150, 250, and 350) with the three company department objects 200, 300 and 400, respectively. Since employees of this company may work for more than one of the company's departments, the company department objects 200, 300 and 400 in FIG. 2 are three instances (many) of company department objects having relationships (425, 450, 550 and 575, respectively) with two (many) employee objects (respectively, 500 and 600). The cross-assignment of employee object 500 to both company department objects 200 and 300, and of employee object 600 to both company department objects 300 and 400, illustrate a complex many to many (M—M) relationship of departments to employees for this company.

DISCRIPTION THE INVENTION

Figure 2:
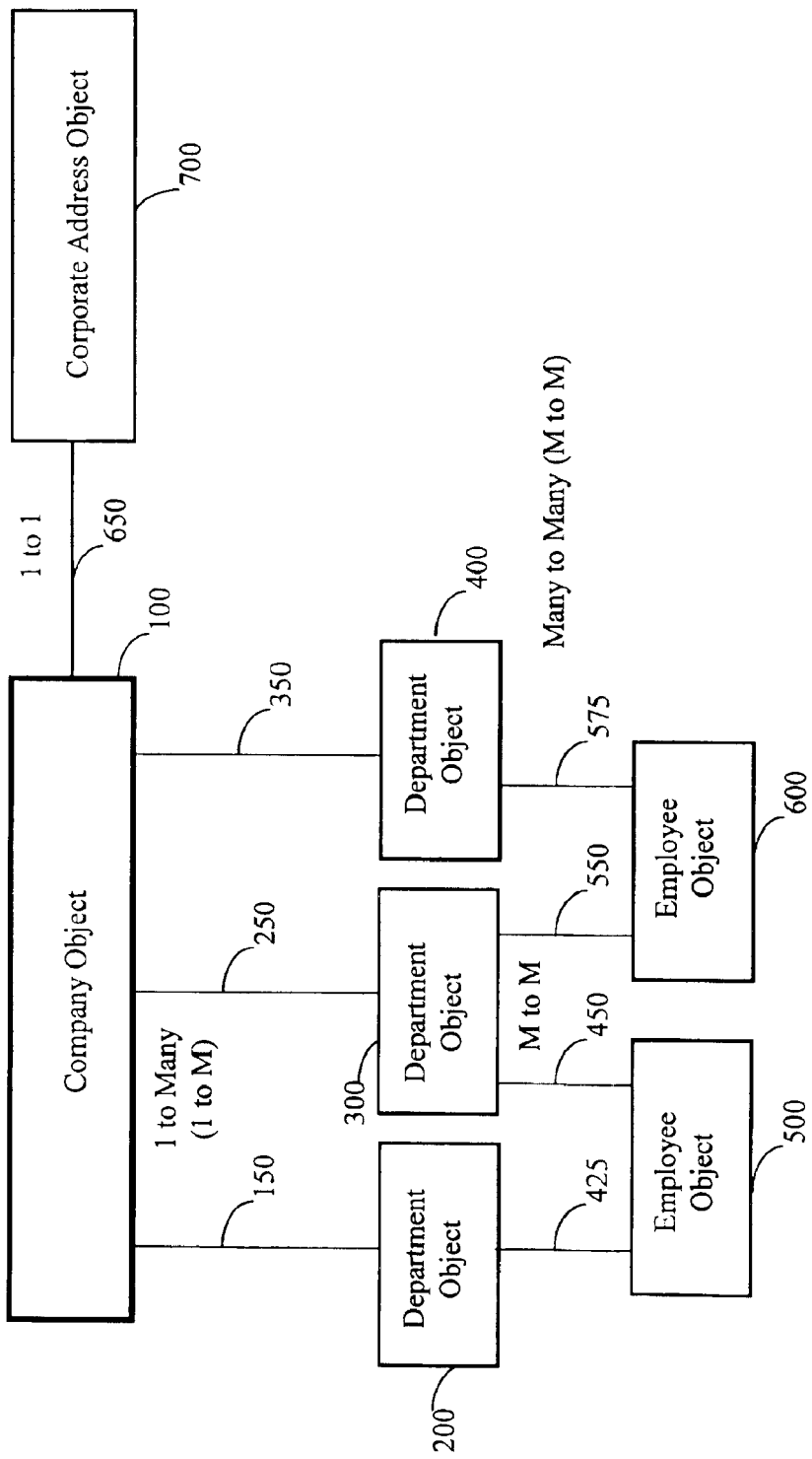

The present invention provides a system for creating, maintaining, accessing, navigating and persisting complex data objects as a complex data object graph model. In one embodiment, the system comprises a computer system having a user interface, a working memory storage area and at least one device for permanently storing information, and said system being loaded with at least one portion of a computer software program, wherein said software program comprises at least one user access interface and a set of programming routines designed for creating, maintaining, accessing, navigating and persisting complex data objects as a CDOG model. In a preferred embodiment, the present invention provides such a system that can display the CDOG model as a graph or set of tables of complex data objects and provides a creating or editing interface for the CDOG model. Most preferred is such a system providing a point and click graphical user interface.

The present invention provides a method for creating, maintaining, accessing, navigating and persisting complex data objects stores as a CDOG model, comprising the steps of:

a) creating a CDOG representation definition,
b) monitoring and recording any changes to the CDOG on a local or distributed computer system, and
c) persisting any changes to the CDOG on a local or distributed computer system by updating the CDOG or CDOG representation definition to reflect and changes to any copies of the CDOG or CDOG representation definition, and saving a copy of the updated CDOG representation definition to a data source or to another type of information repository.

In a preferred embodiment, the present invention provides such a method providing the additional step of displaying or printing a representation of the CDOG model as a graph or set of tables representing complex data objects and their relationships.

The present invention provides a computer software program having at least one user interface and having at least one feature that provides for at least one action selected from the group consisting of creating, maintaining, accessing, navigating and persisting complex data objects as a CDOG model. In a preferred aspect of the invention, the present invention provides a software program, or an association with a software program, having a feature for displaying, printing or displaying and printing a representation of the CDOG model as a graph, or as a set of tables representing a CDOG model. In a further preferred embodiment, such a software program has an editing interface for editing the CDOG model, or has an editable input or source, such as a file, that can be modified to implement changes to the complex data object CDOG model (or has both an interface for editing and an editable input or source, such as a file).

The present invention also provides an application programming interface ("API"), as a preferred embodiment, wherein the API can be accessed to create, maintain, access, navigate and persisting complex data objects as a CDOG model. In one aspect the API can be accessed by an independent computer software program, or by a computer software program module that is part of a software package including the API, to provide at least one action selected from the group consisting of creating, maintaining, accessing, navigating and persisting complex data objects as a CDOG model. In a preferred aspect, the present invention provides such an API as part of a software tool package that provides a method for displaying or printing a representation of the CDOG model as a graph or set of tables representing the CDOG model (or providing methods for both displaying and printing a representation of the CDOG model). In another preferred aspect, such a software tool package that includes the API provides an editing interface for editing the CDOG model, or has an editable input or source, such as a file, that can be modified to implement changes to the CDOG model (or provides both an editing interface and an editable input or source, such as a file,).

A preferred embodiment of the present invention provides a software tool comprising the API according (as described above), adapted for a local network or a distributed network environment, wherein said software tool provides persistence in an object oriented language environment transparently by implementing a configurable network component capable of acquiring and persisting CDOGs through network APIs.

In another preferred embodiment, the CDOG API is the CocoNavigator API which provides support for manipulating complex objects in conjunction with the THOUGHT Inc. CocoBase Enterprise Object/Relational (O/R) database (hereinafter "CocoBase") mapping tool (see U.S. Pat. No. 5,857,197 (incorporated herein in its entirety), for concepts upon which the CocoBase mapping tool is based). An object is considered to be complex when it has established or potential relationships (i.e. links) to other objects. For instance, a Company object instance may be linked to an instance of its corporate address and instances of a Department object, which in turn may be linked to a set of instances of Employee objects. An example of such an CDOG is shown in FIG. 2, for example. The combination of these objects and their links constitute a graph of objects (CDOG model) that can be manipulated using the CocoNavigator API. Since the CocoNavigator API works in a Java Programming language environment, this CDOG example may also be referred to as a JDOG example.

In another preferred embodiment, the invention provides a software tool comprising the API according to the invention or interfacing therewith, wherein the software is adapted for performing the following steps:
  a) reading a source programming object logic model or a database definition file in a format selected from the group consisting of a Unified Modeling Language ("UML") data file, an XML Metadata Interchange ("XMI") data file, and an Extensible Markup Language ("XMI") file; and
  b) converting the information of (a) into a target member selected from the group consisting of a database definition XML file, a database mapping definition file, and a CDOG definition file.

In a further preferred embodiment, the present invention provides a software tool as described above that is adapted for performing at least one of the following additional steps:
  a) displaying a representation of a source programming object logic model or a database definition file in a format selected from the group consisting of a UML data file, a XMI data file, and a XML file;
  b) storing a representation of a source programming object logic model or a database definition file in a format selected from the group consisting of a UML data file, a XMI data file, and a XML file;
  c) printing a representation of a source programming object logic model or a database definition file in a format selected from the group consisting of a UML data file, a XMI data file, and a XML file;
  d) displaying the target information of (b);
  e) storing the target information of (b); and
  f) printing the target information of (b).

In a still further preferred embodiment the software tool described above provides target information that is at least one member selected from the group consisting a CocoBase database definition repository file, a CocoBase map, a CocoNavigate CDOG definition, a CocoNavigate object link descriptor, and a CDOG object graph definition data file. Further preferred is such software, wherein the source is a UML/XMI document containing sufficient DTD information to exchange modeling information with a UML modeling tool.

In one embodiment of the software tool according to the invention, the software tool can be set to automatically generate a persistence layer that corresponds to the source UML class diagrams provided by an exported source file from a case tool capable of exporting UML/XMI, such as Rational Rose, Together and ArgoUML.

An easy way to understand the job performed by a CDOG Navigator API, such as the CocoNavigator API, is to imagine it as a monitor that can provide at least one object to intercept any accesses to the data objects and their relationships that constitute the CDOG, as well as any changes to the data source upon which the CDOG depends, in order to provide a means to persist any changes to the CDOG (or CDOG model) or related data in the data source. Any changes to the CDOG (or CDOG model) can then be propagated by the CDOG Navigator API to a persistent data source through a CocoBase Enterprise O/R connection. Similarly, persistent data that updates a data source can be utilized to create a CDOG model or to update a CDOG model.

Each CDOG (or CDOG model) managed by the CDOG Navigator API can be associated by the CDOG Navigator API with a CDOG descriptor (such as a file) that may be utilized to represent all or part of a "navigation model". In this respect, a navigation model may be abstractly described as essentially a namespace in which a set of data objects and a set of link descriptions (i.e., relationship types between data objects) are each defined. In a preferred embodiment, a data source, data field, data field size and data field type are listed for each data object in the set of data objects. In another preferred embodiment, at least one link description for two data objects, or for a single data object having a circular link (where the link description is utilized in conjunction with the CocoNavigator API and CocoBase mapping tool) contains one or more of the following types of information (however other related information may be utilized):
  at least one link type (e.g., 1:1, 1:M, M:1 and M:M) between data objects
  at least one link qualifier (currently supported qualifiers are STD and BEAN)
  at least one associative CocoBase map (optional, for M:M links only)
  the names of the CocoBase maps related to each of the data objects (usually two maps that are not necessarily distinct), and
  information that may be obtained for each of the CocoBase maps related to the relationship between two data objects, including:
    the name of a relationship link between the two data objects
    the names of the fields (i.e., keys) in a CocoBase map that are used to establish a relationship link between two data objects
    the name of a data source for each of the fields (i.e., keys) in a CocoBase map that are used to establish a relationship link between two data objects
    the names of the fields (i.e., keys) in the associative CocoBase map (optional, for M:M links only)
    the names of a data source for each of the fields (i.e., keys) in the associative CocoBase map (optional, for M:M links only)
    the name(s) of any java classes corresponding to fields that would impact upon the relationship between two data objects
    a setting parameter indicating whether the a loading of a particular CocoBase map that will impact upon a relationship between two data object should be cascaded to other related map(s)
    a setting parameter indicating whether a deletion of information from a particular CocoBase map that will impact upon a relationship between two data object should be cascaded to other related map(s)
    a setting parameter indicating whether an insertion of information into a particular CocoBase map that will impact upon a relationship between two data object should be cascaded to other related map(s), and a setting parameter indicating whether an update of information in a particular CocoBase map that will impact upon a relationship between two data object should be cascaded to other related map(s).

Some preferred features provided by the CocoNavigator API and its associated software, when utilized with the CocoBase mapping tool, or with a similar mapping tool, are as follows:

(a) provides multiple navigation models for the same CDOG model

A preferred embodiment of the CocoNavigator API or an associated program module is configured to allow many navigation models to be used with the same set of java classes and CocoBase maps that are associated with a CDOG model. This preferred embodiment API, or an associated computer program module, may also be configured to permit a user to switch dynamically from one such navigation model to another. Thus, while a given application is being executed, it is possible to completely change the relationships between data objects and how CDOGs of a CDOG model should be managed.

(b) circular link definitions

A preferred embodiment of the CocoNavigator API, or an associated computer program module, is configured to permit a user to create, access, support and correctly manage circular data object links. In a navigation model, a circular link may be defined as occurring when a data object is directly or indirectly linked to itself as part of a CDOG. Such relationships can be created, accessed, supported and correctly managed via the CocoNavigator API.

(c) bi-directional and oriented links

A preferred embodiment of the CocoNavigator API, or an associated computer program module, is configured to permit a user to create, access, support and correctly manage links between data objects as either a bi-directional link or as an oriented link. In this embodiment links between data objects are usually bi-directional links and can be navigated back and forth as an un-oriented navigational model of the CDOG model. With such a bi-directional link feature activated, any object in the navigation model in a given CDOG model can be used as a navigation entry point. In an oriented link navigation model, the link may be set as an oriented link accessible from a single direction. Thus, changes must be made from top down or from bottom up on a relationship tree representation of the navigation model, and some actions may need to originate from a pre-set node of the relationship tree. In this embodiment, such types of links can be created, accessed, supported and correctly managed via the CocoNavigator API.

(d) dynamic link proxy properties

In a preferred embodiment, the CocoNavigator API, or an associated computer program module, is configured to permit a user to populate any object property (e.g., public field or a getter/setter pair) having its type declared as an object class with special dynamic proxies that can monitor and update the state of a relationship link. Examples of such types of object classes are thought.Cocobase.navapi.LinkObjProxy of CocoBase and the Sun Microsystems java class,java.util.Vector. Bi-directional or single directional object references can be consistently maintained in this manner, or by other similar logical mechanisms.

(e) automatic synchronization of object properties

In a preferred embodiment, the CocoNavigator API, or an associated computer program module, can be configured to automatically merge a data object and its properties into a CDOG navigation model representation when the class of object being navigated (being created, accessed, supported or maintained) has a property (e.g., a field or a getter/setter pair) with a name matching the name of a corresponding link as defined in the navigation model.

(f) pure object models

In a preferred embodiment, the CocoNavigator API, or an associated computer program module, can be configured to include a data object as a relationship link to another data object in a navigation model without the need to declare fields and properties for the data object. Such links should be limited however to cases where no computer code dependency will exist between the java classes that will be associated with such linked data objects of the navigation model. Thus, such a navigation model can be a pure abstraction, and more reusable than just a populated version or single hypothetical instance of the abstraction.

(g) customized link visitors

In a preferred embodiment, the CocoNavigator API, or an associated computer program module, can provide an interface which can be configured to permit a visitor object to use this interface to visit (e.g., access or change) a data object that is part of a CDOG navigation model. In conjunction with CocoBase, an example of CocoNavigator API implementing this concept might using a LinkVisitor object (class). Other similar classes may be defined for this purpose. The visitor interface provides a way for a user to customize and adapt the software, and thereby allows a user to extend the functionality of the CocoNavigator API, or the functionality of an associated computer program module, to provide a desired customizable behavior in their CDOG navigation model.

(h) distributed environments

In a preferred embodiment, the CocoNavigator API, or an associated computer program module, can be configured to operate as a tool to create, access, support and correctly manage a CDOG navigation model in a server environment (e.g., in an EJB container) and to persist any changes to the CDOG navigation model when a navigation model is distributed across a local network or when the navigation model involves a distributed network (e.g., a navigation model distributed across internet connections). In one aspect, on the server side of the network, a CDO or a CDOG model of any complexity sent by clients (e.g., serialized copies) across a local network, or across a distributed network, can be correctly merged into a CDOG model by the CocoNavigator API, or by an associated computer program module. Additionally, the CocoNavigator API, or an associated computer program module, can be configured to send a CDO or CDOG model to a client along with link proxies serialized with parts of the CDO or CDOG model that are being monitored by such link proxies. By sending the CDO or CDOG model copy along with such link proxies and associated parts of the CDOG or CDOG model to a client, dynamic link proxies (described above in (d)) can be used by the client side. Accordingly, a CDOG navigation model can be created, accessed, supported, managed and persisted over a distributed network.

(i) group loading or lazy loading of links

In a preferred embodiment, the CocoNavigator API, or an associated computer program module, can be configured to monitor some or all of the data objects (and associated relationship definitions) participating in links of a CDOG navigation model. In a more preferred embodiment, the data objects (and associated relationship definitions) participating in links of a CDOG navigation model can be loaded as they are needed (lazy loading) from a persistent data source or from another type of information repository. This lazy loading feature can permit a very large CDOG navigation model to be loaded in a per-link basis as needed. In a more preferred embodiment, the lazy loading feature can be configured to prevent a link from being loaded twice and can be configured to detect cycles of related loads that have been previously loaded. Such configuration adaptability can be exploited to provide the more efficient use of the resources for a computer system or network or for a distributed computer network.

Some examples of preferred features that can be provided by the CocoNavigator API and its associated software, which are particularly enhanced when utilized with the currently existing CocoBase mapping tool, are as follows:

(aa) CocoBase transactions

A preferred embodiment of the CocoNavigator API or an associated program module is configured to bind a data object or data object relationship of a CDOG navigation model with a CocoBase transaction. Such configurations may be utilized to optimize access to the database server and to enhance performance of the computer system, or systems, involved with the CDOG navigation model.

(bb) non-CBProp objects

The CocoNavigator API or an associated program module can be configured to automatically detect non-CBProp objects (objects with classes that do not implement the CocoBase interface known as the CBProp interface), and automatically create proxies in order to persist such objects as part of a CDOG navigation model.

(cc) virtual foreign key fields

The CocoNavigator API or an associated computer program module can be configured to use proxy classes of CocoBase, such as the CocoProxyM classes, when appropriate. Implementing proxy classes such as the CocoProxyM classes can provide a system for creating, accessing, supporting, properly maintaining and persisting virtual foreign key fields (i.e., foreign key fields do not need to be defined in the object class for Java programming implementations) by the CocoNavigator API, or by an associated computer program module.

(dd) transparent persistence

The CocoNavigator API or an associated computer program module can be configured to use a configurable network component capable of acquiring and persisting CDOGs through network APIs and thereby provide persistence transparently with respect to the applications that are using the CDOGs. In a preferred implementation, there is provided a software tool comprising the CocoNavigator API that is adapted for a local network or for a distributed network environment, wherein the software tool provides persistence in an object oriented language environment transparently by implementing a configurable network component capable of acquiring and persisting CDOGS. Such a concept may be referred to as transparent persistence in the context of this API, because persistence can be obtained without requiring reconfiguring of an existing CDOG model or software application in order to provide such persistence to a computer software application.

From the above description of features of the API, and the features of the CocoNavigator API programming routines described below, an object computer language programmer can produce an API have the functionality of the CocoNavigator API described herein. Essentially the CocoNavigator API has an at least one user access interface, at least one data source access interface and at least three main programming modules consisting of the following programming modules or routines:

I. A programming module or routine constructed to operate on a computer system and to provide the following features to a user or to a software program module of the computer system:
  a) a computer programming sub-routine or sub-module for obtaining from a member selected from the group consisting of a data source, an information repository, and an input device, sufficient information to construct a CDOG model containing one or more CDOGs,
  b) a computer programming subroutine or sub-module for constructing and loading into the memory registers of the computer system a CDOG or a CDOG model representation definition from a data source or other repository, and
  c) a computer programming sub-routine or sub-module for sending a copy of some portion or all of the CDOG representation definition to a user or to a software program module on a local computer system or on a distributed network;

II. A programming module or routine constructed to operate on a computer system and to provide the following features to a user or to a software program module of the computer system:
  a) a computer programming sub-routine or sub-module for monitoring a user or a software program module on a computer system that has accessed or changed a portion of a CDOG or CDOG model, which is included in the CDOG, or CDOG model, representation definition of (I), above, and obtaining any changes to the CDOG or CDOG model,
  b) a computer programming sub-routine or sub-module for monitoring a user or a software program module on a computer system who has obtained a copy of any portion of the CDOG, or CDOG model, representation definition, and for obtaining a copy of any changes that the user might have made to any portion of the CDOG, or CDOG model, representation definition, and
  c) a computer programming sub-routine or sub-module for comparing a copy of a CDOG, CDOG model, or a representation definition of either the CDOG or CDOG model, to an original stored version of the CDOG, CDOG model, or an original stored representation definition for the CDOG or CDOG model, and for updating the original to incorporate any changes to a CDOG or a representation definition that are made by the user or by a software program module; and III. A programming module or routine constructed to operate on a computer system and to provide the following features to a user or software program module of the computer system:
  a) a computer programming sub-routine or sub-module for storing a new CDOG or CDOG model, or storing a definition of either the CDOG or CDOG model, in a data source or in another information repository, and
  b) a computer programming sub-routine or sub-module for persisting (saving to permanent storage) either a changed portion of an updated CDOG, an updated CDOG model, or an updated definition representation for either a CDOG or a CDOG model, to a data source or to another type of information repository.

In a more preferred embodiment, the CDOG API according to the invention, (a preferred embodiment is the CocoNavigator API) can be written with an interface that accesses and uses functionalities of the CocoBase mapping tool, associated programming routines, or associated class libraries. Both the object code and the source code of the CDOG API are contemplated as part of this invention.

In another preferred embodiment, the above described CDOG API can be accessed to create, maintain, access, navigate and persisting complex data objects as a CDOG model. In a particularly preferred aspect, the API can be accessed by a computer software program such as the CocoBase mapping tool, or by a computer software program module that is part of a software package including the API, to provide at least one action selected from the group consisting of creating, maintaining, accessing, navigating and persisting complex data objects as a CDOG model. In an even more preferred aspect, the present invention provides such an API as part of a software tool package having a feature or method for displaying or printing a graph or set of tables representing a CDOG or a CDOG model. In yet another preferred aspect, such a software tool package including the API provides an interface for editing a CDOG, a CDOG model, or for editing a representation definition for a CDOG or a CDOG model to provide a modification that implements a change to a CDOG, or to its definition.

EXAMPLE 1

```
thought.CocoBase.navapi
Class Navigator
java.lang.Object
    |
    +--thought.CocoBase.navapi.Navigator
    public class Navigator
    extends java.lang.Object
```

This class provides support for manipulating complex objects and links (relationships) with CocoBase.
Overview:

Navigator provides support for manipulating complex objects with CocoBase. A object is considered to be complex when it has established relationships (i.e. links) to other objects. For instance, a object company may be linked to instances of Departament, which in turn may be linked to a set of Employee objects. The combination of these objects and their links contitute a graph of objects that can be manipulated using the Navigator class.

A navigator is basically a container that keeps track of the links between objects and allows operations to be performed at the graph level. Thus, it is possible to load, insert, delete or update an entire graph of objects provided a CocoBase connection is given. An easy way of understanding the job performed by a Navigator is to imagine it a monitor of object graphs. For each of these graphs, the Navigator keeps has a memory image and a persistent image. When the Navigator is first used, both the memory and persistent images are empty. As links are populated, the memory image grows. A method (e.g., updateAllLinks ( . . . )) can be then invoked to propagate changes and synchronize the persistent image with the state of the memory image. Conversely, a persistent graph image can be loaded into memory by invoking load-AllLinks ( . . . ).

The funcionality available in the Navigator class is similar to that available in the old CocoNavigate class, but it is provided here at an instance level. Thus, it is possible to have several Navigator instances associated to the same or different models. Further, all memory resources can be reclaimed by the garbage collector once the instance is no longer needed.

Features implemented in this version:
multiple navigation models —a navigation model is essencially a namespace in which a set of link descriptions is defined. Each model is identified and defined by the properties file that describes the link information and is associated to set of object graphs. A model can be specified by invoking the method setmodel ( . . . ). Once a model is defined, description contained in the model_name.properties file or in the CocoBase repository (not available yet) is translated into CBLink link descriptors (see class CBLink for details). If no model is specified, a model called "CocoNavLinks" is automatically created from the description contained in CocoNavLinks.properties. It is possible to work with more than one model (and properties files) at the same time and to switch between those models as well. The basic format of a properties file that describes a model is the following:

```
;list of links defined for MapName1
MapName1_LINKS=linkName1, [,linkName1 [, . . .]]
;the list of field labels used as navigation key in
MapName1
MapName1_linkName1_KEY=keyName1 [,keyName2 [, . . . ]]
;the name of the map that maps the target object
MapName1_linkName1_TARGET_MAP=mapName
;the list of field labels used as navigation key in the
target map
MapName1_linkName1_TARGET_KEY=keyName1
[, keyName2 [, . . . ]]
;the full class name of the java class corresponding to
the target map
MapName1_linkName1_TARGET_CLASS=pkgname.class name
;the type of the link (one-to-many, one-to-one, many-to-
one, many-to-many)
MapName1_linkName1_TARGET_TYPE=1_M(default)
|1_1|M_1|M_M
;the qualifier of the link (used for code generation
purposes)
MapName1_linkName1_TARGET_QUALIFIER=STD_LINK(default)
|BEAN_LINK
;will the target object be automatically loaded (use false
for "lazy" load)
MapName1_linkName1_AUTONAV=true)default) |false
;will this link cascade deletion to the target object?
MapName1_linkName1_TARGET_DELETE=true(default) |false
;will this link cascase updates to the target object?
MapName1_linkName1_TARGET_UPDATE=true|false(default)
;will this link cascade insertion to the target object?
MapName1_linkName1_TARGET_INSERT=true(default) |false
;specify this link definition as inverse of another
(optional when type is 1_1, 1_M, M_1)
MapName1_linkName1_INVERSE_OF=mapName_linkName
;the name of the associative map for many-to-many links
(requires _INVERSE_OF entry)
MapName1_linkName1_M_TO_M_MAP=mapName
```

EXAMPLE

```
. . .
Department_LINKS=employees
Department_employees_KEY=ID
Department_employees_TARGET_KEY=DEPARTMENT
Department_employees_TARGET_MAP=Employee
Department_employees_TARGET_CLASS=com.foo.Employee
Department_employees_TARGET_TYPE=1_M
Department_employees_TARGET_QUALIFIER=STD_LINK
Department_employees_AUTONAV=true
Department_employees_TARGET_DELETE=true
Department_employees_TARGET_INSERT=true
Department_employees_TARGET_UPDATE=true
. . .
Employee_LINKS=dependents
. . .
``` circular references are supported —in the object model, a circular reference or cycle occurs when it is possible for object to directly or indirectly refer to itself. Such models are supported and correctly managed by the INVERSE_OF keyword that can be included in the properties file. Note that "inverse" links between objects are inherently bi-directional and can be navigated back and forth, as in a unoriented graph (as long as navigation is enabled in both directions). This is a very important feature since it allows any object in a given graph to be used as an navigation entry point.

```
...
Employee_LINKS=department
...
Employee_department_INVERSE_OF=Department_employees
...
Employee_LINKS=employees
...
Department_employees_INVERSE_OF=Employee_department
...
``` support for dynamic fields —upon loading a graph, any object property (i.e. public field or getter/setter pair) that has the type declared as a java. util. Vector or as a thought.Cocobase.navapi.LinkobjProxy will be populated with special dynamic proxies that monitor and update the state of a link, provided the property name matches the link name of the corresponding link. This allows bi-directional references to be automatically maintained in a consistent way. For example:

```
class Employee implements CBProp {
  LinkObjProxy department;
  ...
}
class Department implements CBProp {
  Vector employees;
  ...
}
Navigator n = new Navigator (myBase);
Department hardware = myBase.select (new
Department (100, "HARDWARE", aCompany));
// load a graph of objects from a given department
n.loadAllLinks (hardware);
// add this point hardware.employees is populated with a
special dynamic Vector
Employee john = new Employee (10010, "John", "123 Main St");
// at this point john.department is null and
hardware.employees.contains(john)==false
hardware.employees.addElement(john);
// at this point john.department is a special dynamic
proxy containing hardware
// and hardware.employees.contains(john)==true
john.department.set (null);
// at this point john.department.get( )==null and
hardware.employees.contains(john)==false
n.addLink(john, "department", hardware);
// at this point john.department.get( )==hardware
// and hardware.employees.contains(john)==true
...
```

In the example above, if an Employee object is added to the vector employees of a Department object, it will have that department automatically contained in the proxy field department. Conversely, if that Employee object sets the object contained by the proxy field department to null, the department will be automatically removed from the Vector employees of the corresponding department. Also, any calls to addLink ( . . . ) and removeLink( . . . ) will have the result reflected in the corresponding fields.

automatic synchronization of object properties —if the class of the object being used as an entry point for navigation has a property (field or getter/setter pair) with a name matching the name of the corresponding link as defined in the model, the contents of such property will be automatically merged with the object graph. So if, for example, in the case where references between objects are created "manually" (i.e. links are not automatically populated by the loadAllLinks method) and updateAllLinks ( . . . ) is invoked, before the update actually occurs, the references between the objects will be identified and the corresponding links will be created and merged into the object graph.

In the code bellow, the references between anEmp and aChild through the field dependends will be automatically identified (since the referring field has the same name as the link name defined for the class Employee in the navigation model) and will be added to the graph. As a result, a call to updateAllLinks ( . . . ,anEmp, . . . ) will provoke the insertion of both anEmp and aChild to the memory and persistent images of that graph (note that the navigation model mast have cascade insertion enabled in the direction Employee->dependents for that to happen):

```
public class Employee {
    String name;
    Vector dependents;
    ...
}
public class Dependent {
    String name;
    Employee parent;
    ...
}
...
Employee anEmp = new Employee ("John Foo");
Dependent aChild = new Dependent ("Lori Foo");
anEmp.dependents = new java.util.Vector( );
anEmp.dependents.addElement (aChild);
// at this point aChild.parent==null and
anEmp.dependents.contains (aChild)==true
...
Navigator n = new Navigator (myBase);
n.updateAllLinks (anEmp, "Department", true);
// at this point the object graph contains a link between
anEmp and aChild
// and aChild.parent==anEmp
...
``` support for pure object models —objects do not necessarily have to declare fields/properties in order to establish links with other objects. Instead, the methods addLink( . . . ),getAllLinkedTo( . . . )and removeLink( . . . ) can be used for that purpose. Thus, the object model can be pure and more reusable, provided no code dependency will exist between the classes. The concept of virtual foreign key fields (i.e. foreign key fields do not need to be defined in the object class) and non-CBProp object classes (i.e. classes that do not implement CBProp) are also supported for that same purpose.

customized link visitors —objects in the object graph can be visited by visitor objects (i.e. objects that implement the LinkVisitor interface), thus allowing the functionality to be extended with customized behavior. For example, the code bellow creates a visitor object that prints contents of the visited link so that the whole object graph can be printed by invoking the method visitAllLinks( . . . ).

```
...
n.visitAllLinks (hardware,
  new LinkVisitor( ) {
  public void
```

-continued

```
visitLink (CocoDriverInterface cdi,
                              CBLink
cbLink,
                              Object obj,
                              String
mapName,
                              String
linkName,
                              Object
target,
                              int
distance,
                              boolean
hasBeenVisited) {
  for (int i=0; i < distance+1;
i++) System.out.pring ("\t"); // we use tabs to indicate the
level in the tree
    System.out.println ("["+
linkName +"]" + target + (hasBeenVisited ? "++" : ""));
  }
};
false);
...
```

Complete usage example:

Assume the following object model:

```
class Employee implements CBProp {
    long id;
    String name;
    Employee lmanager;
    Vector lsubordinates;
    LinkObjProxy ldepartment;
        ...
}
class Department implements CBProp {
    long id;
    String name;
    Vector lemployees;
    LinkObjProxy lcompany;
        ...
}
class Company implements CBProp {
    long id;
    String name;
    Vector ldepartments;
        ...
}
```

Suppose the following database description (assume each table has a corresponding map definition) for the object model given above:

```
CREATE TABLE COMPANY (
    ID NUMERIC (15),
    NAME VARCHAR (15) )
CREATE TABLE DEPARTMENT (
    ID NUMERIC (15),
    NAME VARCHAR (15),
    COMPANY NUMERIC (15 ) )
CREATE TABLE EMPLOYEE (
    ID NUMERIC (15),
    NAME VARCHAR (15),
    DEPARTMENT NUMERIC (15),
    MANAGER NUMERIC (15) )
```

The CocoNavLinks.properties file is something like:

```
#This is the navigation properties file
Company_LINKS=ldepartments
Company_ldepartments_KEY=ID
Company_ldepartments_TARGET_KEY=COMPANY
Company_ldepartments_TARGET_MAP=Department
Company_ldepartments_TARGET_CLASS=com.foo.Department
Company_ldepartments_TARGET_TYPE=1_M
Company_ldepartments_TARGET_QUALIFIER=STD_LINK
Company_ldepartments_AUTONAV=true
Company_ldepartments_TARGET_DELETE=true
Company_ldepartments_TARGET_UPDATE=false
Company_ldepartments_TARGET_INSERT=true
Company_ldepartments_INVERSE_OF=Department_lcompany
Department_LINKS=lcompany, lemployees
Department_lcompany_KEY=COMPANY
Department_lcompany_TARGET_KEY=ID
Department_lcompany_TARGET_MAP=Company
Department_lcompany_TARGET_CLASS=com.foo.Company
Department_lcompany_TARGET_TYPE=M_1
Department_lcompany_TARGET_QUALIFIER=STD_LINK
Department_lcompany_AUTONAV=true
Department_lcompany_TARGET_DELETE=false
Department_lcompany_TARGET_UPDATE=false
Department_lcompany_TARGET_INSERT=false
Department_lcompany_INVERSE_OF=Company_ldepartments
Department_lemployees_KEY=ID
Department_lemployees_TARGET_KEY=DEPARTMENT
Department_lemployees_TARGET_MAP=Employee
Department_lemployees_TARGET_CLASS=com.foo.Employee
Department_lemployees_TARGET_TYPE=1_M
Department_lemployees_TARGET_QUALIFIER=STD_LINK
Department_lemployees_AUTONAV=true
Department_lemployees_TARGET_DELETE=true
Department_lemployees_TARGET_INSERT=true
Department_lemployees_TARGET_UPDATE=true
Department_lemployees_INVERSE_OF=Employee_ldepartment
Employee_LINKS=ldepartment, lmanager, lsubordinates
Employee_ldepartment_KEY=DEPARTMENT
Employee_ldepartment_TARGET_KEY=ID
Employee_ldepartment_TARGET_MAP=Department
Employee_ldepartment_TARGET_CLASS=com.foo.Department
Employee_ldepartment_TARGET_TYPE=M_1
Employee_ldepartment_TARGET_QUALIFIER=STD_LINK
Employee_ldepartment_AUTONAV=true
Employee_ldepartment_TARGET_DELETE=false
Employee_ldepartment_TARGET_UPDATE=false
Employee_ldepartment_TARGET_INSERT=false
Employee_ldepartment_INVERSE_OF=Department_lemployees
Employee_lmanager_KEY=MANAGER
Employee_lmanager_TARGET_KEY=ID
Employee_lmanager_TARGET_MAP=Employee
Employee_lmanager_TARGET_CLASS=com.foo.Employee
Employee_lmanager_TARGET_TYPE=M_1
Employee_lmanager_TARGET_QUALIFIFER=STD_LINK
Employee_lmanager_AUTONAV=true
Employee_lmanager_TARGET_DELETE=false
Employee_lmanager_TARGET_UPDATE=false
Employee_lmanager_TARGET_INSERT=false
Employee_lmanager_INVERSE_OF=Employee_lsubordinates
Employee_lsubordinates_KEY=ID
Employee_lsubordinates_TARGET_KEY=MANAGER
Employee_lsubordinates_TARGET_MAP=Employee
Employee_lsubordinates_TARGET_CLASS=com.foo.Employee
Employee_lsubordinates_TARGET_TYPE=1_M
Employee_lsubordinates_TARGET_QUALIFIFER=STD_LINK
Employee_lsubordinates_AUTONAV=true
Employee_lsubordinates_TARGET_DELETE=false
Employee_lsubordinates_TARGET_INSERT=true
Employee_lsubordinates_TARGET_UPDATE=false
Employee_lsubordinates_INVERSE_OF=Employee_lmanager
```

Let us now use the Navigator class accordingly:

```
...
Company company = myBase.select (new
Company (1, "FOO"), "Company");
n = new Navigator (myBase)
// load a graph of objects from a given department
n.loadAllLinks (company, "Company");
int hdwidx = company.ldepartments.indexOf (new
Department (100, "hardware"));
Department hardware =
company.ldepartments.elementAt (hdwIdx);
// let us make some changes to the graph using the proxy
fields
Employee john = new Employee (10010, "John Foo", "123 Main
St");
hardware.lemployees.addElement (john);
// at this point, john.ldepartment.get ( ) == hardward and
// hardware.lemployees.contains (john) == true
// let us remove some of the links using the proxy fields
hardward.lemployees.removeElementAt (0);
company.ldepartments.removeElement (new
Department (200, "ACCOUNT"));
// let us update all changes
n.updateAllLinks (company, "Company");
// let us now make some more changes to the graph using
the navigator
mary = new Employee (10010, "John Foo", "123 Main
St", hardware);
// the line below will create a link between "mary" and
"hardware" and automatically
// add "mary" to the "hardward.lemployees" Vector and
// assign "hardware" to the "mary.ldeparment" field
n.addLink (mary, "Employee", "ldeparment", hardware);
// the line below has no effect since "mary" and
"hardward" are already linked
n.addLink (hardware, "Department", "lemployees", mary);
// let us set john as mary's supervisor
n.addLink (john, "Employee", "lsubordinates", mary);
// we can also retrieve all employees subordinated to john
using the navigator
Object [ ] johnsSubordinates =
n.getAllLinkedTo (john, "Employee", "lsubordinates");
// and remove one of his subordinates
Employee fstJohnSubordinate = (Employee)
john.subordinates.firstElement( );
n.removeLink (fstJohnSubordinate, "Employee", "lmanager", john)
;
// which has the exact same effect as
n.removeLink (john, "Employee", "lsubordinates", fstJohnSubordinate);
// or as removing from the Vector directly
john.subordinates.removeElement (fstJohnSubordinate);
// let us now update all changes since the last call to
updateAllLinks
n.updateAllLinks (company);
// at this point both the memory and persistent graph
images are synchronized
...
```

See Also:
   thought.CocoBase.navapi, CBLink

Constructor Summary

Navigator ( )
Constructs a Navigator instance using the default model
Navigator (CocoDriverInterface cdi)
   Constructs a Navigator instance using the default model
      and sets its CocoBase connection to a persistent data
      source.
Navigator (CocoDriverInterface cdi, java.lang.String model)
   Constructs a Navigator instance using the given model
      and sets its CocoBase connection to a persistent data
      source.
Navigator (java.lang.String model)
   Constructs a Navigator instance using the given model.

TABLE 1

| | Method Summary |
|---|---|
| void | addLink (java.lang.Object object, java.lang.String linkName, java.lang.Object target) Invokes addLink (Object, String, String, Object) sending object.getClass ( ).getName ( ) as the map name. |
| void | addLink (java.lang.Object obj, java.lang.String mapName, java.lang.String linkName, java.lang.Object target) Establishes a link between two objects in the object graph of this Navigator |
| void | clear ( ) Clears the memory and persistent graph images held by this Navigator and resets all information about loaded links. |
| int | deleteAllLinks (java.lang.Object object) Invokes deleteAllLinks (Object, String, boolean) sending object.getClass ( ).getName ( ) as the map name and true as the deleteRoot flag. |
| int | deleteAllLinks (java.lang.Object object, java.lang.String mapName) Invokes deleteAllLinks (Object, String, boolean) sending true as the deleteRoot flag. |
| int | deleteAllLinks (java.lang.Object obj, java.lang.String mapName, boolean deleteRoot) Deletes all objects linked to a given object, recusively, from the persistent data source. |
| java.lang.Object | findObject (java.lang.Object object, java.lang.String mapName) Finds the object instance in the memory graph image of this Navigator that is equal to the given object. |
| java.lang.Object [ ] | getAllLinkedTo (java.lang.Object object, java.lang.String linkName) Invokes getAllLinkedTo (Object, String, String) sending object.getClass ( ).getName ( ) as the map name. |
| java.lang.Object [ ] | getAllLinkedTo (java.lang.Object obj, java.lang.String mapName, java.lang.String linkName) Returns an array containing the objects linked to a given object through a given link. |
| CocoDriverInterface | getConnection ( ) Returns the CocoBase connection to a persistent data source associated to this Navigator |
| static int | getDebugLevel ( ) Returns the current debug level. |
| static Navigator | getInstance (java.lang.String instanceId) Returns a Navigator object registered in the internal static pool. |
| java.lang.String | getModel ( ) Returns the current model associated to this Navigator. |
| static java.util.Enumeration | getRegisteredIds ( ) Returns an Enumeration object containing with all the ids of instances registered in the internal static pool. |
| Transaction | getTransaction ( ) Returns the CocoBase transaction this Navigator should use to bind objects when updating the persistent data source. |
| int | insertAllLinks (java.lang.Object object) Invokes insertAllLinks (Object, String, boolean) sending object.getClass ( ).getName ( ) as the map name and true as the insertRoot flag. |
| int | insertAllLinks (java.lang.Object object, java.lang.String mapName) Invokes insertAllLinks (Object, String, boolean) sending true as the insertRoot flag. |

TABLE 1-continued

Method Summary

| | |
|---|---|
| int | insertAllLinks (java.lang.Object obj, java.lang.String mapName, boolean insertRoot) Inserts all objects linked to a given object recusively, in the persistent data source. |
| java.lang.Object | loadAllLinks (java.lang.Object object) Invokes loadAllLinks (Object, String, boolean) sending object.getClass ( ).getName ( ) as the map name and true as the bindObjects flag |
| java.lang.Object | loadAllLinks (java.lang.Object object, java.lang.String mapName) Invokes loadAllLinks (Object, String, boolean) sending true as the bindObjects flag. |
| java.lang.Object | loadAllLinks (java.lang.Object obj, java.lang.String mapName, boolean bindObjects) Loads all objects linked to a given object, recusively, from the persistent data source. |
| java.lang.Object | loadLink (java.lang.Object object, java.lang.String mapName, java.lang.String linkName) Invokes loadLink (Object, String, String, boolean, boolean) sending object.getClass ( ).getName ( ) as the map name, true as the bindObjects flag and true as the forceLoad flag. |
| java.lang.Object | loadLink (java.lang.Object obj, java.lang.String mapName, java.lang.String linkName, boolean bindObjects, boolean forceLoad) Loads all objects linked to a given object through the specified link from the persistent data source. |
| java.lang.Object | loadLinks (java.lang.Object object) Invokes loadLinks (Object, String, boolean) sending object.getClass ( ).getName ( ) as the map name and true as the bindObjects flag. |
| java.lang.Object | loadLinks (java.lang.Object object, java.lang.String mapName) Invokes loadLinks (Object, String, boolean) sending true as the bindObjects flag. |
| java.lang.Object | loadLinks (java.lang.Object obj, java.lang.String mapName, boolean bindObjects) Loads all objects linked to a given object from the persistent data source. |
| static void | registerInstance (java.lang.String instanceID, Navigator nav) Adds a Navigator object to the internal static pool. |
| void | removeLink (java.lang.Object object, java.lang.String linkName, java.lang.Object target) Invokes removeLink (Object, String, String, Object) sending object.getClass ( ).getName ( ) as the map name. |
| void | removeLink (java.lang.Object obj, java.lang.String mapName, java.lang.String linkName, java.lang.Object target) Removes a link between two objects. |
| void | removeLinks (java.lang.Object obj) Invokes removeLinks (Object, String) sending object.getClass ( ).getName ( ) as the map name. |
| void | removeLinks (java.lang.Object obj, java.lang.String mapName) Removes an object from the object graph by removing all existing links to that object. |
| void | setConnection (CocoDriverInterface cdi) Associates the CocoBase connection to a persistent data source with this Navigator. |
| static void | setDebugLevel (int level) Sets the current debug level. |
| void | setModel (java.lang.String modelName) Sets the model to be used by this Navigator. |
| void | setProperties (java.util.Properties properties) Sets the properties that control the behavior of this Navigator. |
| void | setTransaction (Transaction transaction) Sets the transaction to which objects should be bound by this Navigator when updating the persistent data source. |
| static void | unregisterInstance (java.lang.String instanceId) Removes a Navigator object from the internal static pool. |
| int | updateAllLinks (java.lang.Object object) Invokes updateAllLinks (Object, String, boolean) sending object.getClass ( ).getName ( ) as the map name and true as the updateRootflag. |
| int | updateAllLinks (java.lang.Object object, java.lang.String mapName) /**Invokes updateAllLinks (Object, String, boolean) sending true as the updateRoot flag. |
| int | updateAllLinks (java.lang.Object obj, java.lang.String mapName, boolean updateRoot) Updates the persistent data source with all changes made to memory graph image that are not yet propagated to the persistent graph image. |
| int | visitAllLinks (java.lang.Object object, LinkVisitor visitor, boolean sync) Invokes visitAllLinks (Object, String, LinkVisitor, boolean) sending object.getClass ( ).getName ( ) as the map name. |
| int | visitAllLinks (java.lang.Object obj, java.lang.String mapName, LinkVisitor visitor, boolean sync) Visits a given object and invokes visitor.visitLink (. . .) for each of the target objects linked to it, recusively. |

Methods inherited from class java.lang.Object clone, equals, finalize, getClass, hashCode, notify, notifyAll, toString, wait, wait, wait Constructor Detail Navigator Constructor Examples public Navigator( )

Constructs a Navigator instance using the default model public Navigator (CocoDriverInterface cdi)

Constructs a Navigator instance using the default model and sets its CocoBase connection to a persistent data source.

Parameters:

cdi —the CocoBase connection to a persistent data source public Navigator(CocoDriverInterface cdi, java.lang.String model)

Constructs a Navigator instance using the given model and sets its CocoBase connection to a persistent data source.

Parameters:

cdi —the CocoBase connection to a persistent data source model —the CocoBase connection to a persistent data source public Navigator(java.lang.String model)

Constructs a Navigator instance using the given model.

Parameters:

model —the CocoBase connection to a persistent data source

Navigation Method Detail addLink

| public void addLink | (java.lang.Object obj, |
| --- | --- |
| | java.lang.String mapName, |
| | java.lang.String linkName, |
| | java.lang.Object target) |

Establishes a link between two objects in the object graph of this Navigator. Does not have any effect if the link already exists or if a corresponding link is not defined in the current model. In order to make the link persistent, either the method updateAllLinks . . . ) or the method insertAllLinks( . . . ) must be invoked.

If the class of the object being linked has a property (getter/setter pair or public field) with a name that matches the given link name, that property will be set with the object being linked. Also, any "special" Vector or proxy fields that populate such object property will be notified to add the new linked object.

Parameters:

obj—the source object mapName —the map name corresponding to the class of obj linkName —the name of the link that connects obj to the target target —the target object See Also:

updateAllLinks(Object,String,boolean), insertAllLinks(Object, String)

deleteAllLinks

| public int deleteAllLinks | (java.lang.Object object, |
| --- | --- |
| | java.lang.String mapName) |

Invokes deleteAllLinks(Object,String,boolean) sending true as the deleteRoot flag.

Parameters:

object —the object used as entry-point for navigating in the object graph mapName —the map name corresponding to the class of object Returns:

the number of objects deleted

See Also:

deleteAllLinks(Object,String,boolean)

getAllLinkedTo

| public java.lang.Object[ ] getAllLinkedTo | (java.lang.Object obj, |
| --- | --- |
| | java.lang.String mapName) |
| | java.lang.String linkName) |

Returns an array containing the objects linked to a given object through a given link. An empty array is returned if no linked object is found or if a corresponding link is not defined in the current model.

Parameters:

obj —Object the source object mapName —String the map name corresponding to the class of obj linkname —String the link name that identifies the link Returns:

Object[] the array of linked objects insertAllLinks

| public int insertAllLinks | (java.lang.Object object, |
| --- | --- |
| | java.lang.String mapName) |

Invokes insertAllLinks (Object, String,boolean) sending true as the insertRoot flag.

Parameters:

object —the object used as entry-point for navigating in the object graph mapName —the map name corresponding to the class of object Returns:

the number of objects inserted

See Also:

insertAllLinks(Object,String,boolean)

loadAllLinks

| public java.lang.Object loadAllLinks | (java.lang.Object object, |
| --- | --- |
| | java.lang.String mapName) |

Invokes loadAllLinks(Object,String,boolean) sending true as the bindObjects flag.

Parameters:

object —the object used as entry-point for navigating in the object graph mapName —the map name corresponding to the class of object Returns:

the modified instance of the object passed in

See Also:

loadAllLinks(Object,String,boolean)

removeLink

| public void removeLink | (java.lang.Object obj, |
| --- | --- |
| | java.lang.String mapName, |
| | java.lang.String linkName, |
| | java.lang.Object target) |

Removes a link between two objects. Does not have any effect if the link does not exist or if a corresponding link is not defined in the current model.

If the class of the object being unlinked has a property (getter/setter pair or public field) with a name that matches the given link name, any "special" proxy fields that populate such object property will be notified to remove the unlinked object.

Parameters:

obj —the source object mapName —the map name corresponding to the class of obj linkName —the name of the link that connects obj to the target target —the target object See Also:
updateAllLinks(Object,String,boolean)
updateAllLinks

| public int updateAllLinks | (java.lang.Object object, java.lang.String mapName) |

/**InvokesupdateAllLinks(Object,String,boolean) sending true as the updateRoot flag.
Parameters:
object —the object used as entry-point for navigating in the object graph
mapName —the map name corresponding to the class of object
Returns:
the total number of objects updated, deleted or inserted
See Also:
updateAllLinks(Object,String,boolean)
visitAllLinks

| public int visitAllLinks | (java.lang.Object obj, java.lang.String mapName, LinkVisitor visitor, boolean sync) |

Visits a given object and invokes visitor. visitLink( . . . ) for each of the target objects linked to it, recusively. This method is provided as a generic mechanism to implement customized behavior that can be aplied to all objects of an object graph that are reachable from a given navigation entry point. If this method is used to propagate changes to a persistent data source, the flag sync should be set to true.
Parameters:
obj —the object used as entry-point for navigating in the object graph
mapName —the map name corresponding to the class of obj
visitor —LinkVisitor the visitor object
sync —boolean indicates if the memory image graph should be synchronized the persistent image in the end of the process
Returns:
int the number of objects visited
addLink

| public void addLink | (java.lang.Object object, java.lang.String linkName, java.lang.Object target) |

Invokes addLink(Object,String,String,Object) sending object.getclass( ) .getname( ) as the map name.
Parameters:
object —the source object
linkName —the name of the link that connects object to the target
target —the target object
See Also:
addLink(Object,String,String,Object)
deleteAllLinks
public int deleteAllLinks(java.lang.Object object)
Invokes deleteAllLinks (Object, String, boolean) sending object.getClass( ) .getName( ) as the map name and true as the deleteroot flag.

Parameters:
object —the object used as entry-point for navigating in the object graph
Returns:
the number of objects deleted
See Also:
deleteAllLinks(Object,String,boolean)
deleteAllLinks

| public int deleteAllLinks | (java.lang.Object obj, java.lang.String mapName, boolean deleteRoot) |

Deletes all objects linked to a given object, recusively, from the persistent data source. The object given as parameter will also be deleted if the deleteRoot flag is true. Note that only the objects to which deletion should cascade (according to the current model) will be deleted. In case a CocoBase Transaction is defined, the objects will be bound to be deleted instead. The deleted object will also be removed from object graph and both persistent and memory graph images will be synchronized to the persistent data source with respect to the deleted objects. Note that objects to be inserted will not be added to the persistent image so that a subsequent call to insertAllLinks( . . . ) or updateAllLinks( . . . ) will insert such objects.
If the class of the object given as parameter has a property (getter/setter pair or public field) with a name that matches a given link name, the referred objects reachable by that link will recursively "merge" into the object graph before the deletion phase takes place. Also, any "special" Vector or proxy fields that populate such object property will be notified to remove the deleted links.
Parameters:
obj —the object used as entry-point for navigating in the object graph
mapName —the map name corresponding to the class of obj
deleteRoot —indicates if obj must be deleted
Returns:
the number of objects deleted
See Also:
insertAllLinks(Object,String,boolean), updateAllLinks (Object,String,boolean)
getAllLinkedTo

| public java.lang.Object [ ] getAllLinkedTo | (java.lang.Object object, java.lang.String linkName) |

Invokes getAllLinkedTo(Object, String, String) sending object.getclass ) getName( ) as the map name.
Parameters:
object —the source object
linkName —the name of the link that connects object to the target linked objects
Returns:
the array containing the linked objects
See Also:
getAllLinkedTo(Object, String, String)
getConnection
public CocoDriverInterface getconnection ( )
Returns the CocoBase connection to a persistent data source associated to this Navigator.

Returns:
CocoDriverInterface the CocoBase connection
getDebugLevel
public static int getDebugLevel( )
Returns the current debug level. 0 means debug is not enabled.
Returns:
the debug level
getModel
public java.lang.String getModel( )
Returns the current model associated to this Navigator.
Returns:
the String representing the current model
insertAllLinks
public int insertAllLinks(java.lang.Object object)
Invokes insertAllLinks (Object, String, boolean) sending object. getClass ( ) .getName ( ) as the map name and true as the insertRoot flag.
Parameters:
object —the object used as entry-point for navigating in the object graph
Returns:
the number of objects inserted
See Also:
insertAllLinks(Object,String,boolean)
insertAllLinks

| public int insertAllLinks | (java.lang.Object obj, java.lang.String mapName, boolean insertRoot) |
|---|---|

Inserts all objects linked to a given object, recusively, in the persistent data source. The object given as parameter will also be inserted if the insertRoot flag is true. Note that only the objects to which insertion should cascade (according to the current model) and that are not yet in the persistent graph image will be inserted. In case a Coco-Base Transaction is defined, the objects will be bound to be inserted instead. After a successful invocation of this method, the persistent and memory graph images will be synchronized to the persistent data source with respect to the deleted objects. Note that objects to be deleted will not be included in the persistent image so that a subsequent call to deleteAllLinks( . . . ) or updateAllLinks ( . . . ) will delete such objects.
If the class of the object given as parameter has a property (getter/setter pair or public field) with a name that matches a given link name, the referred objects reachable by that link will recursively "merge" into the object graph before the insertion phase takes place.
Parameters:
cdi —the CocoBase connection
obj —the object used as entry-point for navigating in the object graph
mapName —the map name corresponding to the class of obj
insertRoot —indicates if obj must be inserted
Returns:
the number of objects inserted
See Also:
deleteAllLinks(Object,String,boolean), updateAllLinks (Object,String,boolean)
loadAllLinks
public java.lang.Object loadAllLinks(java.lang.Object object)
Invokes loadAllLinks (Object,String,boolean) sending object.getclass( ) .getName( ) as the map name and true as the bindobjects flag.

Parameters:
object —the object used as entry-point for navigating in the object graph
Returns:
the modified instance of the object passed in
See Also:
loadAllLinks(Object,String,boolean)
loadAllLinks

| public java.lang.Object loadAllLinks | (java.lang.Object obj, java.lang.String mapName, boolean bindObjects) |
|---|---|

Loads all objects linked to a given object, recusively, from the persistent data source. Note that only the objects to which load should cascade (according to the current model) will be loaded. If a CocoBase transaction is defined and the flag bindObjects is true, the loaded objects will be bound to that transaction. All objects loaded will be add to both the memory and persistent graph images. The links followed will be marked as visited for the object being loaded and will not be followed again for the same object. Thus, any subsequent call to loadAllLinks( . . . ),loadLinks( . . . ) or loadLink( . . . ) for the object being loaded will have no effect on the visited links.
If the class of the object being loaded has a property (getter/setter pair or public field) with a name that matches a given link name, that object property will be set with the object loaded through that link. Also, if such property is declared as a java. util. Vector or a LinkObj Proxy, a special "dynamic" proxy will be used to populate the property, so that it can not only be notified about changes in the link but also propagate such changes to other proxies monitoring that same link.
Parameters:
obj —the object used as entry-point for navigating in the object graph
mapName —the map name corresponding to the class of obj
bindObjects —indicates if the loaded objects will be bound to the current CocoBase transaction
Returns:
the modified instance of the object passed in
See Also:
loadLinks(Object,String,boolean), loadLink(Object,String, String,boolean,boolean),LinkObjProxy
loadLink

| public java.lang.Object loadLink | (java.lang.Object object, java.lang.String linkName) |
|---|---|

Invokes loadLink(Object,String,String,boolean,boolean) sending object.getclass ( ) .getName( ) as the map name, true as the bindObjects flag and true as the forceLoad flag.
Parameters:
object —the object of which the given link will be loaded
linkName —the name of the link to be followed
Returns:
the modified instance of the object passed in See Also:
loadAllLinks(Object,String,boolean), loadLinks(Object, String,boolean)
loadLink

| public java.lang.Object loadLink | (java.lang.Object object, java.lang.String mapName, java.lang.String linkName) |

Invokes loadLink (Object, String, String,boolean,boolean) sending true as the bindobjects flag and true as the forceLoad flag.
Parameters:
object —the object of which the given link will be loaded
mapName —the map name corresponding to the class of object
linkName —the name of the link to be followed
Returns:
the modified instance of the object passed in
See Also:
loadAllLinks(Object,String,boolean), loadLinks(Object, String,boolean)
loadLink

| public java.lang.Object loadLink | (java.lang.Object obj, java.lang.String mapName, java.lang.String linkName, boolean bindObjects, boolean forceLoad) |

Loads all objects linked to a given object through the specified link from the persistent data source. If forceLoad is false, the objects will be loaded only if load should cascade to those objects (according to the current model). However, forceLoad is true, the link will be followed regardless of the direction specified in the model. If a CocoBase transaction is defined and the flag bindObjects is true, the loaded objects will be bound to that transaction. All objects loaded will be add to both the memory and persistent graph images. The given link will be marked as visited for the object being loaded and will not be followed again for the same object. Thus, any subsequent call to loadAllLinks ( . . . ), loadLinks( . . . ) or loadLink( . . . ) for the object being loaded will have no effect on the given link.
If the class of the object given as parameter has a property (getter/setter pair or public field) with a name that matches a given link name, that object property will be set with the object loaded through that link. Also, if such property is declared as a java. util. Vector or a LinkObjProxy, a special "dynamic" proxy will be used to populate the property, so that it can not only be notified about changes in the link but also propagate such changes to other proxies monitoring that same link.
Parameters:
obj —the object of which the given link will be loaded
mapName —the map name corresponding to the class of obj
linkName —the name of the link to be followed
bindobjects —indicates if the loaded objects will be bound to the current CocoBase transaction
forceLoad —indicate if the link should be followed regardless of the direction specified in the model
Returns:
the modified instance of the object passed in See Also:
loadAllLinks(Object,String,boolean), loadLinks(Object, String,boolean),LinkObjProxy
loadLinks
public java.lang.Object loadLinks(java.lang.Object object)
Invokes loadLinks(Object,String,boolean) sending object-.getclass ( ) .getName( ) as the map name and true as the bindObjects flag.
Parameters:
object —the object of which links will be loaded
Returns:
the modified instance of the object passed in
See Also:
loadLinks(Object,String,boolean)
loadLinks

| public java.lang.Object loadLinks | (java.lang.Object object, java.lang.String mapName) |

Invokes loadLinks (Object, String, boolean) sending true as the bindObjects flag.
Parameters:
object —the object of which links will be loaded
mapName —the map name corresponding to the class of object
Returns:
the modified instance of the object passed in
See Also:
loadLinks(Object,String,boolean)
loadLinks

| public java.lang.Object loadLinks | (java.lang.Object obj, java.lang.String mapName, boolean bindObjects) |

Loads all objects linked to a given object from the persistent data source. Note that only the objects to which load should cascade (according to the current model) will be loaded and that these objects will NOT be processed recursively. If a CocoBase transaction is defined and the flag bindObjects is true, the loaded objects will be bound to that transaction. All objects loaded will be add to both the memory and persistent graph images. The links followed will be marked as visited for the object being loaded and will not be followed again for the same object. Thus, any subsequent call to loadAllLinks ( . . . ), loadLinks( . . . ) or loadLink( . . . ) for the object being loaded will have no effect on the visited links.
If the class of the object given as parameter has a property (getter/setter pair or public field) with a name that matches a given link name, that object property will be set with the object loaded through that link. Also, if such property is declared as a java. util. Vector or a LinkObj Proxy, a special "dynamic" proxy will be used to populate the property, so that it can not only be notified about changes in the link but also propagate such changes to other proxies monitoring that same link.
Parameters:
obj —the object of which links will be loaded
mapName —the map name corresponding to the class of obj
bindobjects —indicates if the loaded objects will be bound to the current CocoBase transaction Returns:
the modified instance of the object passed in
See Also:
loadAllLinks(Object,String,boolean), loadLink(Object, String,String,boolean,boolean),LinkObjProxy
removeLink

| public void removeLink | (java.lang.Object object, java.lang.String linkName, java.lang.Object target) |

Invokes removeLink(Object,String,String,Object) sending object.getClass( ) getName( ) as the map name.
Parameters:
object —the source object
linkName —the name of the link that connects object to the target
target —the target object
See Also:
removeLink (Object, String, String,Object)
removeLinks

| public void removeLinks | (java.lang.Object obj, java.lang.String mapName) |

Removes an object from the object graph by removing all existing links to that object. Linked objects are not followed, that is, the removal of links is NOT a recusive procedure.
If the class of the object being unlinked has a property (getter/setter pair or public field) with a name that matches the name of the link being removed, any "special" Vector fields that populate such object property will be notified to remove the unlinked objects.
Parameters:
obj —Object the source object
mapName —String the map name corresponding to the class of obj
setConnection
public void setConnection(CocoDriverInterface cdi)
    Associates the CocoBase connection to a persistent data source with this Navigator.
    Parameters:
    cdi —thought.CocoBase.CocoDriverInterface
setDebugLevel
public static void setDebugLevel(int level)
    Sets the current debug level. 0 means debug is not enabled.
    Parameters:
    level —the debug level
setModel
public void setModel(java.lang.String modelName)
    Sets the model to be used by this Navigator. If the model has never been used before, tries to load the corresponding link descriptions from the repository and/or navigation bundle (the properties file modelName.propertiesmust be located directly under one of the directories in the class path or under a subdirectory called resources).
    Parameters:
    modelName —the model name descriptions associated to the given model updateAllLinks
public int updateAllLinks(java.lang.Object object)
    Invokes updateAllLinks(Object,Strinq,boolean) sending object.getClass( ).getName( ) as the map name and true as the updateRoot flag.
    Parameters:
    object —the object used as entry-point for navigating in the object graph
    Returns:
    the total number of objects updated, deleted or inserted
    See Also:
    updateAllLinks(Object,String,boolean)
updateAllLinks

| public int updateAllLinks | (java.lang.Object obj, java.lang.String mapName, boolean updateRoot) |

Updates the persistent data source with all changes made to memory graph image that are not yet propagated to the persistent graph image. If the updateRoot flag is true, the object given as parameter will be inserted (if it is not in the persistent graph image) or updated (if it is already in the persistent graph image).
All current and removed links will be followed recursively and marked for deletion, update or insertion, depending on if the link being followed was removed or not from the memory graph image. Deletion has priority over insertion and updates, which means that, if an objects is supposed to be deleted through a link and updated through another, that object will be marked for deletion. Note that deletion will cascade through a given link only if the object being marked for deletion is supposed to do so according to the current model. The same holds for insertion and update. After a successful invocation of this method, both memory and persistent graph images are synchronized.
If the class of the object given as parameter has a property (getter/setter pair or public field) with a name that matches a given link name, the referred objects reachable by that link will recursively "merge" into the object graph before the update phase takes place.
Parameters:
obj —the object used as entry-point for navigating in the object graph
mapName —the map name corresponding to the class of obj
updateRoot —indicates if obj must be inserted/updated
Returns:
the total number of objects updated, deleted or inserted
visitAllLinks

| public int visitAllLinks | (java.lang.Object object, LinkVisitor visitor, boolean sync) |

Invokes visitAllLinks (Object,String,LinkVisitor,boolean) sending object.getclass ( ).getName( ) as the map name.
Parameters:
object —the object used as entry-point for navigating in the object graph
visitor —LinkVisitor the visitor object
sync —boolean indicates if the memory image graph should be synchronized the persistent image in the end of the process Returns:
int the number of objects visited
See Also:
visitAllLinks (Object,String,LinkVisitor,boolean)
clear
public void clear ( )
Clears the memory and persistent graph images held by this Navigator and resets all information about loaded links. This method is provided as a facility to re-initialize an instance, instead of having to create a new one. Note that the CocoBase connection and model associated to this Navigator remains unchanged.
getInstance
public static Navigator getInstance(java.lang.String instanceId)
Returns a Navigator object registered in the internal static pool. This method is provided as a facility to manage shared Navigator instances. Note, however, that this class is not thread safe and any necessary synchronizations must be properly implemented externally.
Parameters:
instanceId —the String that identifies the instance in the pool
getRegisteredIds
public static java.util.Enumeration getRegisteredIds( )
Returns an Enumeration object containing with all the ids of instances registered in the internal static pool. This method is provided as a facility to manage shared Navigator instances. Note, however, that this class is not thread safe and any necessary synchronizations must be properly implemented externally.
getTransaction
public Transaction getTransactions ( )
Returns the CocoBase transaction this Navigator should use to bind objects when updating the persistent data source.
Returns:
the CocoBase transaction; null if no transaction should be used
See Also:
setTransaction(thought.CocoBase.Transaction)
registerInstance

| public static void registerInstance | (java.lang.String instanceId, Navigator nav) |

Adds a Navigator object to the internal static pool. This method is provided as a facility to manage shared Navigator instances. Note, however, that this class is not thread safe and any necessary synchronizations must be properly implemented externally.
Parameters:
instanceId —the String that identifies the instance in the pool
nav —the Navigator instance to be registered
removeLinks
public void removeLinks(java.lang.Object obj)
Invokes removeLinks (Object, String) sending object.getclass( ) .getName( ) as the map name.
Parameters:
obj —the source object
See Also:
removeLinks (Object, String)
setTransaction
public void setTransaction(Transaction transaction)
Sets the transaction to which objects should be bound by this Navigator when updating the persistent data source. If this method is never called, this Navigator will check if there is a global transaction currently defined and the default behavior is to bind objects to that transaction. The default behavior can be overriden by calling setProperties( . . . ).
Parameters:
transaction —the CocoBase transaction
See Also:
setProperties(java.util.Properties)
unregisterInstance
public static void unregisterInstance(java.lang.String instanceId)
Removes a Navigator object from the internal static pool. This method is provided as a facility to manage shared Navigator instances. Note, however, that is class is not thread safe and any necessary synchronizations must be properly implemented externally.
Parameters:
instanceId —the String that identifies the instance in the pool
findObject

| public java.lang.Object findObject | (java.lang.Object object, java.lang.String mapName) |

Finds the object instance in the memory graph image of this Navigator that is equal to the given object. The method equals is used for comparison.
Parameters:
object —the object to look for
Returns:
the object in this Navigator that is equal to the given object; null, if no instance is found
setProperties
public void setProperties(java.util.Properties properties)
Sets the properties that control the behavior of this Navigator. Currently supported properties are:
useCurrentTransaction ="true" (default) | "false"—a String indicating that this Navigator will try to bind objects to the global Transaction currently defined (when updating the persistent data source) in case no other transaction was assigned using the setTransaction (Transaction) method.
alwaysCreateProxies ="true" | "false" (default) —a String indicating that this Navigator will create link proxies for object properties (field or get/set method pair) even when the property is already populated (i.e. is not null).
Parameters:
properties —the properties to be assigned
See Also:
setTransaction(Transaction)

EXAMPLE 2

Company Example

A CD ROM is incorporated herein by reference to provide a list of the Java source code. properties definition and script files (text of the files) that may be utilized as a representative example with CocoNavigate. The CD incorporated by Reference is entitled Example 2 (and including a duplicate) included on a single disk with a single file titled Example 2, and sized at 370 KB.

The present invention may be embodied in specific forms other than those particularly described above or illustrated by the appended drawings. Upon viewing the present application preferred embodiments and other descriptions herein of the present invention, variations and other implementations that do not depart from the spirit and scope of the present invention will be apparent to one of routine skill in this field. Such variations and other implementations are considered part of the present invention and within the scope of the appended claims. Accordingly, reference should be made to the appended claims, rather than to the forgoing specification and drawings, as indicating the scope of the present invention.

We claim:

1. A local or distributed computer system for creating, maintaining, accessing, navigating and persisting complex data objects as a CDOG model, wherein the system comprises a user interface, a working memory storage area and at least one device for permanently storing information, and said system is loaded with at least one portion of a computer software program that comprises at least one user access interface and a set of programming routines designed for creating, maintaining, accessing, navigating and persisting complex data objects as a CDOG model and the said software program has at least one feature selected from the group consisting of:
   a) a feature providing a method for displaying or printing a representation of a CDOG model, a definition representation or other representation thereof, as a graph or as a set of tables of complex data objects and relationships, and
   b) a feature providing an interface for editing a CDOG model or for editing a definition or other representation thereof, or providing an interface for an editable input or source, such as a file, that can be modified to implement changes to a CDO or its relationships of a CDOG model.

2. A system according to claim 1, providing an interface for displaying or editing the CDOG model, or for displaying or editing a definition or other representation of the CDOG model, as a graph or set of tables representing complex data objects and their relationships.

3. A method of using a local or distributed computer system for creating, maintaining, accessing, navigating and persisting complex data objects as a CDOG model, comprising the steps of:
   a) loading at least one software program module on the local or distributed system for creating, maintaining, accessing, navigating and persisting objects as a CDOG model,
   b) creating a CDOG representation definition,
   c) monitoring and recording any changes to the CDOG on a local or distributed computer system, and
   d) persisting any changes to the CDOG on a local or distributed computer system by updating the CDOG or CDOG representation definition to reflect and changes to any copies of the CDOG or CDOG representation definition, and saving a copy of the updated CDOG representation definition to a data source or to another type of information repository.

4. A method according to claim 3, comprising the additional step of displaying or printing a representation of the CDOG model as a graph or as set of tables representing at least one complex object and a relationship to a data object, or a definition representation of at least one of either a complex data object and a relationship, or a definition representation of the complex data object and a relationship.

5. A computer software program for using a local or distributed computer system to create, maintain, access, navigate and persist complex data objects as a CDOG model, said software program comprises:
   at least one user interface and at least one executable feature providing at least one action on a computer system selected from creating, maintaining, accessing, navigating and persisting complex data objects as a CDOG model,
   wherein executing said program can create a new CDOG model, access a CDOG model stored from a tangible medium maintain a CDOG model, or persist a new or updated CDOG model to a storage medium.

6. A computer software program according to claim 5, having at least one additional executable feature selected from the group consisting of:
   a) a feature providing a method for displaying or printing a representation of a CDOG model, a definition representation or other representation thereof, as a graph or as a set of tables of complex data objects and relationships, and
   b) a feature providing an interface for editing a CDOG model or for editing a definition or other representation thereof, or providing an interface for an editable input or source, such as a file, that can be modified to implement changes to a CDO or its relationships of a CDOG model.

7. An API that can be accessed to create, maintain, access, navigate and persisting complex data objects as a CDOG model, wherein the said API comprises at least one user access interface, at least one data source access interface and at least three main programming modules consisting of the following programming modules or routines:
   I. A programming module or routine constructed to operate on a computer system and to provide the following features to a user or to a software program module of the computer system:
      a) a computer programming sub-routine or sub-module for obtaining from a member selected from the group consisting of a data source, an information repository, and an input device, sufficient information to construct a CDOG model containing one or more CDOGs,
      b) a computer programming sub-routine or sub-module for constructing and loading into the memory registers of the computer system a CDOG or a CDOG model representation definition from a data source or other repository, and
      c) a computer programming sub-routine or sub-module for sending a copy of some portion or all of the CDOG representation definition to a user or to a software program module on a local computer system or on a distributed network;
   II. A programming module or routine constructed to operate on a computer system and to provide the following features to a user or to a software program module of the computer system:
      a) a computer programming sub-routine or sub-module for monitoring a user or a software program module on a computer system that has accessed or changed a portion of a CDOG or CDOG model, which is included in the CDOG, or CDOG model, representation definition of (I), above, and obtaining any changes to the CDOG or CDOG model,
      d) a computer programming sub-routine or sub-module for monitoring a user or a software program module on a computer system who has obtained a copy of any portion of the CDOG, or CDOG model, representation definition, and for obtaining a copy of any changes that the user might have made to any portion of the CDOG, or CDOG model, representation definition, and e) a computer programming sub-routine or sub-module for comparing a copy of a CDOG, CDOG model, or a representation definition of either the CDOG or CDOG model, to an original stored version of the CDOG, CDOG model, or an original stored representation definition for the CDOG or CDOG model, and for updating the original to incorporate any changes to a CDOG or a representation definition that are made by the user or by a software program module; and III. A programming module or routine constructed to operate on a computer system and to provide the following features to a user or software program module of the computer system:

a) a computer programming sub-routine or sub-module for storing a new CDOG or CDOG model, or storing a definition of either the CDOG or CDOG model, in a data source or in another information repository, and b) a computer programming sub-routine or sub-module for persisting (saving to permanent storage) either a changed portion of an updated CDOG, an updated CDOG model, or an updated definition representation for either a CDOG or a CDOG model, to a data source or to another type of information repository.

8. An API according to claim 7, further having an interface that accesses and uses functionalities of an data source to data source mapping tool, associated programming routines, or associated class libraries.

9. An API according to claim 7, further having an interface that accesses and uses functionalities of an object to relational or relational to object database mapping tool, associated programming routines, or associated class libraries.

10. An API according to claim 7, having a feature for, or being associated with a computer program or module having a feature that provides a method for, displaying or printing a representation of a complex data object CDOG model, or for printing a definition or other defining representation thereof, as a graph or set of tables representing CDOs and their relationships.

11. A software tool comprising the API according to claim 7, adapted for a local network or a distributed network environment, wherein said software tool provides persistence in an object oriented language environment transparently by implementing a configurable network component capable of acquiring and persisting CDOGs throught network APIs.

12. A software tool according to claim 7, adapted for performing the following steps:

a) reading a source programming object logic model or a database definition file in a format selected from the group consisting of a UML data file, a XMI data file, and a XML file; and b) converting the information of (a) into a target member selected from the group consisting of a database definition XML file, a database mapping definition file, and a CDOG definition file.

13. A software tool according to claim 12, adapted for performing at least one of the following additional steps:

a) displaying a representation of a source programming object logic model or a database definition file in a format selected from the group consisting of a UML data file, a XMI data file, and a XML file;

b) storing a representation of a source programming object logic model or a database definition file in a format selected from the group consisting of a UML data file, a XMI data file, and a XML file;

c) printing a representation of a source programming object logic model or a database definition file in a format selected from the group consisting of a UML data file, a XMI data file, and a XML file;

d) displaying the target information of (b);

e) storing the target information of (b); and f) printing the target information of (b).

14. A software tool according to claim 13, wherein the target information is at least one member selected from the group consisting a CocoBase database definition repository file, a CocoBase map, a CocoNavigate CDOG definition, a CoCoNavigate object link descriptor, and a CDOG object graph definition data file.

15. A software tool according to claim 13, wherein the source is a UML/XMI document containing sufficient DTD information to exchange modeling information with a UML modeling tool.

16. A software tool according to claim 15, wherein the software tool automatically generates a persistence layer that corresponds to the source UML class diagrams provided by an exported source file from a case tool capable of exporting UML/XMI such as Rational Rose, Together and ArgoUML.

* * * * *